United States Patent
Sundararajan

(10) Patent No.: US 9,841,117 B2
(45) Date of Patent: Dec. 12, 2017

(54) ACTUATOR

(71) Applicant: Alagarsamy Sundararajan, Sugarland, TX (US)

(72) Inventor: Alagarsamy Sundararajan, Sugarland, TX (US)

(73) Assignee: SRI Energy, Inc., Stafford, TX (US)

( * ) Notice: Subject to any disclaimer, the term of this patent is extended or adjusted under 35 U.S.C. 154(b) by 363 days.

(21) Appl. No.: 14/486,559

(22) Filed: Sep. 15, 2014

(65) Prior Publication Data

US 2015/0076378 A1    Mar. 19, 2015

Related U.S. Application Data

(60) Provisional application No. 61/878,838, filed on Sep. 17, 2013.

(51) Int. Cl.
*F16K 31/122*    (2006.01)
*F16K 3/02*    (2006.01)

(52) U.S. Cl.
CPC ........ *F16K 31/1221* (2013.01); *F16K 3/0254* (2013.01); *F16K 31/122* (2013.01); *Y10T 137/6072* (2015.04)

(58) Field of Classification Search
CPC .......... F16K 17/00; F16K 17/02; F16K 17/04; F16K 17/168; F16K 31/12; F16K 31/122; F16K 31/1221; F16K 31/1223; G05D 16/10; G05D 16/103; Y10T 137/0514; Y10T 137/6069; Y10T 137/6072; Y10T 137/7831
See application file for complete search history.

(56) References Cited

U.S. PATENT DOCUMENTS

| | | | |
|---|---|---|---|
| 4,535,967 A * | 8/1985 | Babbitt ............... | F16K 31/1221 251/193 |
| 4,744,386 A * | 5/1988 | Frazer ................. | F16K 31/1221 137/315.29 |
| 5,244,004 A * | 9/1993 | Robertson ............... | F15B 20/00 137/14 |
| 6,041,804 A * | 3/2000 | Chatufale ............... | E21B 34/04 137/15.23 |
| 6,352,239 B1 * | 3/2002 | McIntosh ................ | E21B 34/04 251/100 |

FOREIGN PATENT DOCUMENTS

GB    1090523 A  *  11/1967  ......... F16K 31/1221

* cited by examiner

*Primary Examiner* — Ryan Reis
(74) *Attorney, Agent, or Firm* — Trop, Pruner & Hu, P.C.

(57) ABSTRACT

A valve actuator assembly having an actuator housing coupled to a bonnet and a housing lid. A hydraulic cylinder is positioned within the actuator housing and directly coupled to the bonnet. A piston is positioned within the hydraulic cylinder and coupled to a spring lifter assembly and a spring is positioned within the actuator housing and having a first end and a second end, the first end being coupled to a lower surface of the housing lid, and the second end being coupled to the spring lifter assembly. An operating stem is coupled to the piston and positioned in a channel extending through the bonnet to a valve body assembly.

20 Claims, 5 Drawing Sheets

ACTUATOR

CROSS REFERENCE TO RELATED APPLICATIONS

This application is a non-provisional application of provisional application 61/878,838 filed on Sep. 17, 2013.

FIELD OF THE INVENTION

The present invention relates generally to actuators and, in a particular embodiment, to an apparatus and method for an improved actuator.

BACKGROUND OF THE INVENTION

Actuators are well known in the art to control fluid within valve assemblies. Specially, Actuators are used to control gate valves and other sliding stem-type valves by selectively moving a stem to insert or remove the valve member into/from the flow of fluid to stop or allow the flow when desired. There is a need for an actuator that is more reliable and more efficient during operation.

SUMMARY OF THE INVENTION

In one embodiment of the invention, there is provided a valve actuator assembly having an actuator housing coupled to a bonnet and an housing lid and a hydraulic cylinder positioned within the actuator housing and threadingly and/or bolted to the bonnet. A piston is positioned within the hydraulic cylinder and coupled to a spring lifter assembly. A spring is positioned within the actuator housing having a first end and a second end, the first end may be coupled to a lower surface of the housing lid, and the second end being may be coupled to the spring lifter assembly. An operating stem is coupled to the piston and positioned in a channel extending through the bonnet to a valve body assembly.

In another embodiment of the invention, there is provided a valve actuator having an actuator housing coupled to a bonnet and a housing lid. A hydraulic cylinder is positioned within the actuator housing and coupled to the bonnet and a piston is positioned within the hydraulic cylinder and coupled to a spring lifter assembly. A spring is positioned within the actuator housing and is provided with a first end and a second end, the first end being coupled to a lower surface of the housing lid, and the second end being coupled to the spring lifter assembly. An operating stem is coupled to the piston and positioned in a channel extending through the bonnet to a valve body assembly connecting to the gate. An internal pressure compensator is positioned within the actuator housing and adjacent to the lower surface of the housing lid, the internal pressure compensator having an internal piston, an outer sleeve and an inner sleeve.

BRIEF DESCRIPTION OF THE DRAWINGS

The present invention will become more fully understood from the detailed description and the accompanying drawings, wherein.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE DRAWINGS

The following description of the preferred embodiment(s) is merely exemplary in nature and is in no way intended to limit the invention, its application, or uses.

Figure 1:
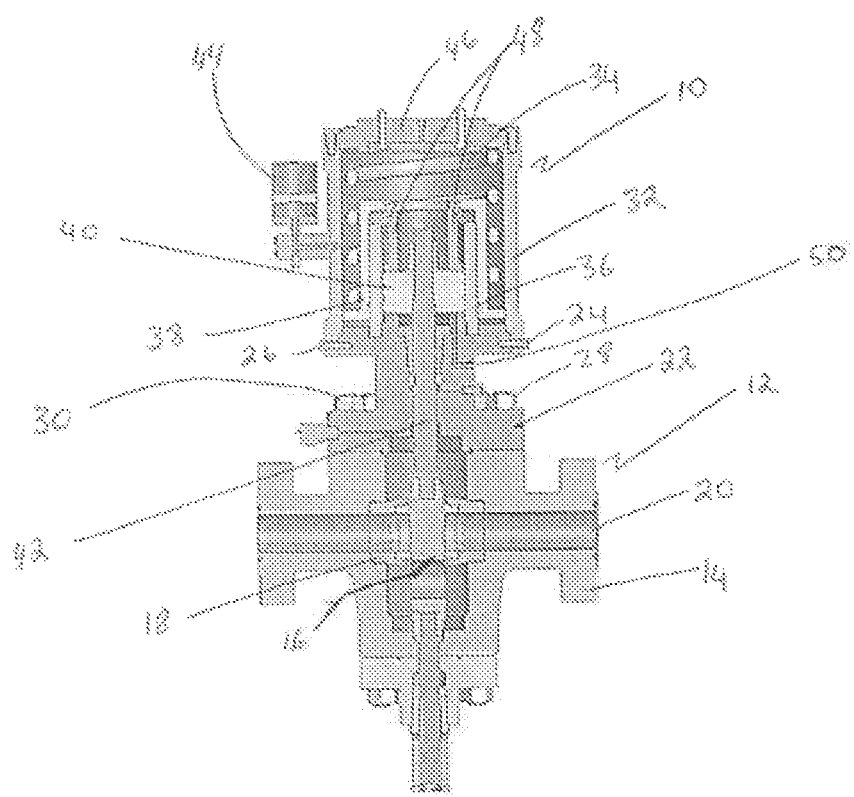
FIG. 1 is a cross-sectional view of an improved actuator and valve assembly.
Figure 2:
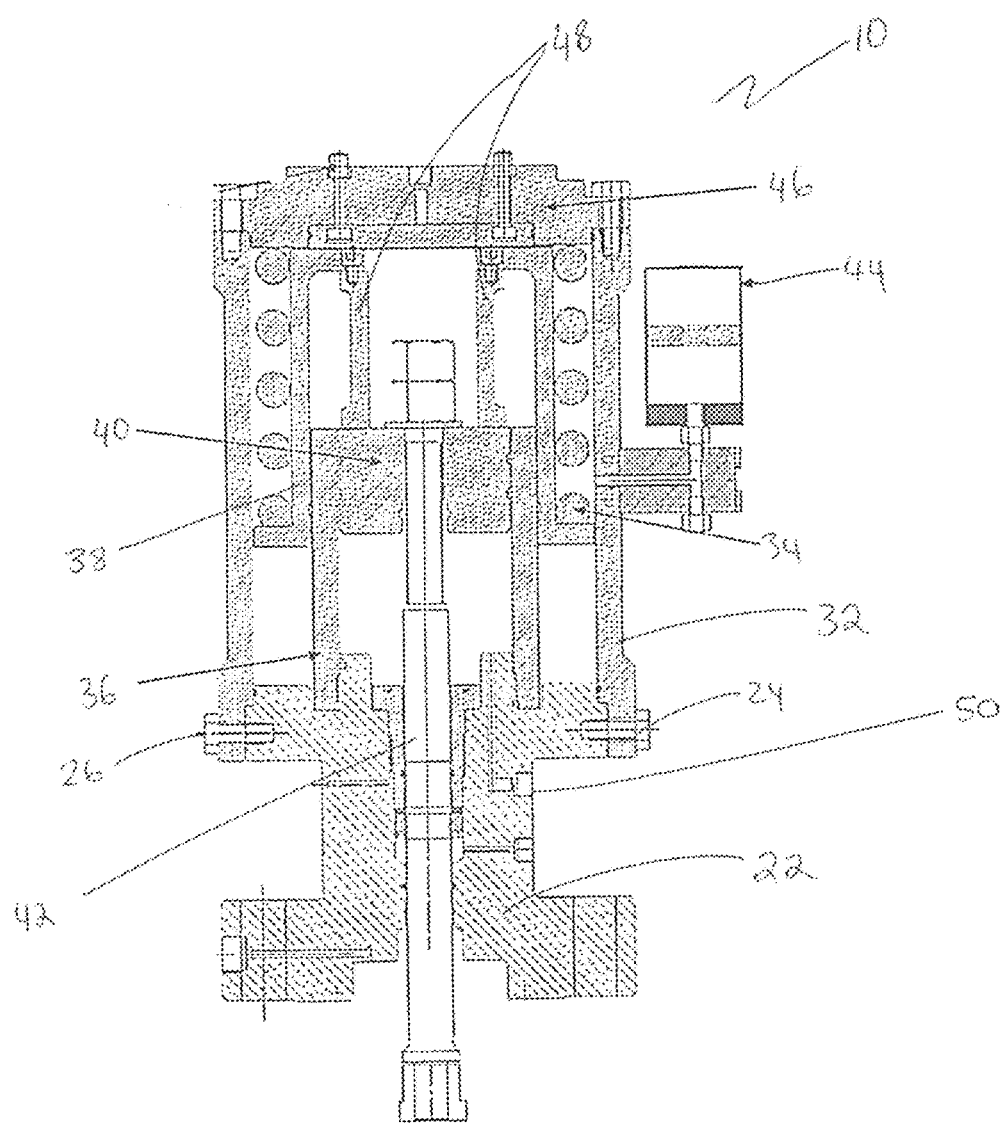
FIG. 2 is a more detailed cross-sectional view of the improved actuator of FIG. 1.
Figure 3:
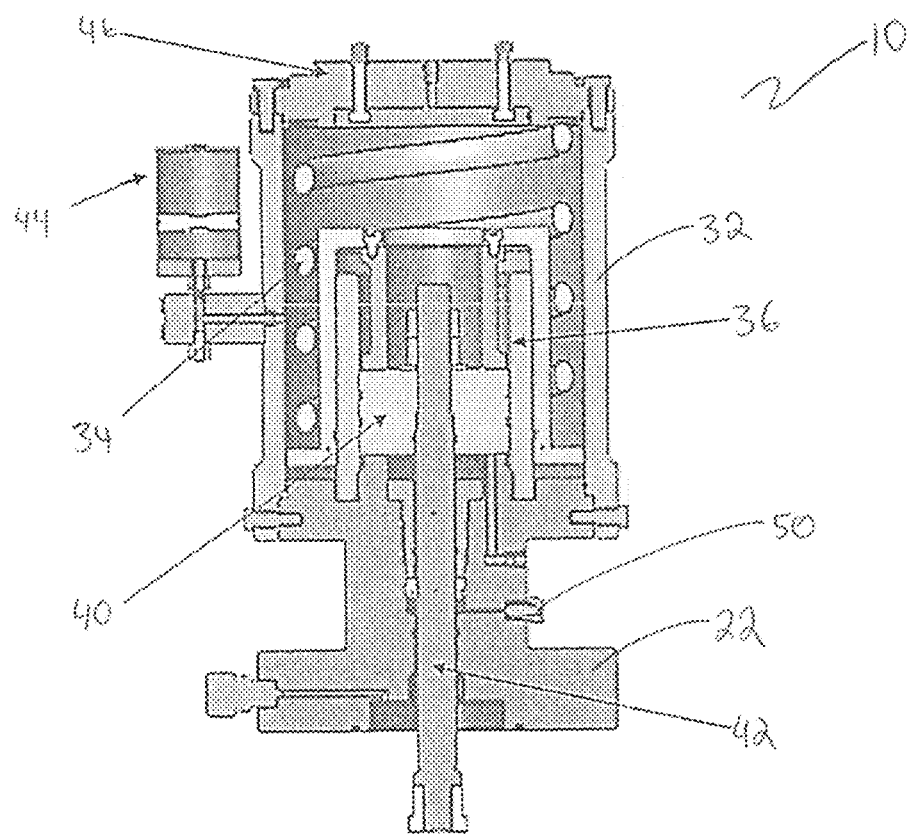
FIG. 3 is another cross-sectional view of the improved actuator of FIGS. 1 and 2.

FIGS. 1-3 illustrate a hydraulic actuator in accordance with one aspect of the invention. FIG. 1 more specifically shows the hydraulic actuator 10 coupled to a gate valve assembly 12. The gate valve assembly 12 includes a valve body 14, gate valve 16, and a seat assembly 18. The gate 16 is configured so that it can be moved between an open position and a closed position to control the fluid flow through the passageway 20.

The actuator 10 is coupled to the bonnet 22 through bolts 24, 26 which may be removable. It should be noted that although bolts are illustrated, any other type of fastening mechanism may be used to secure the bonnet 22 to the actuator 10. The bonnet 20 is also coupled to the valve body assembly through bolts 28, 30.

Figure 4:
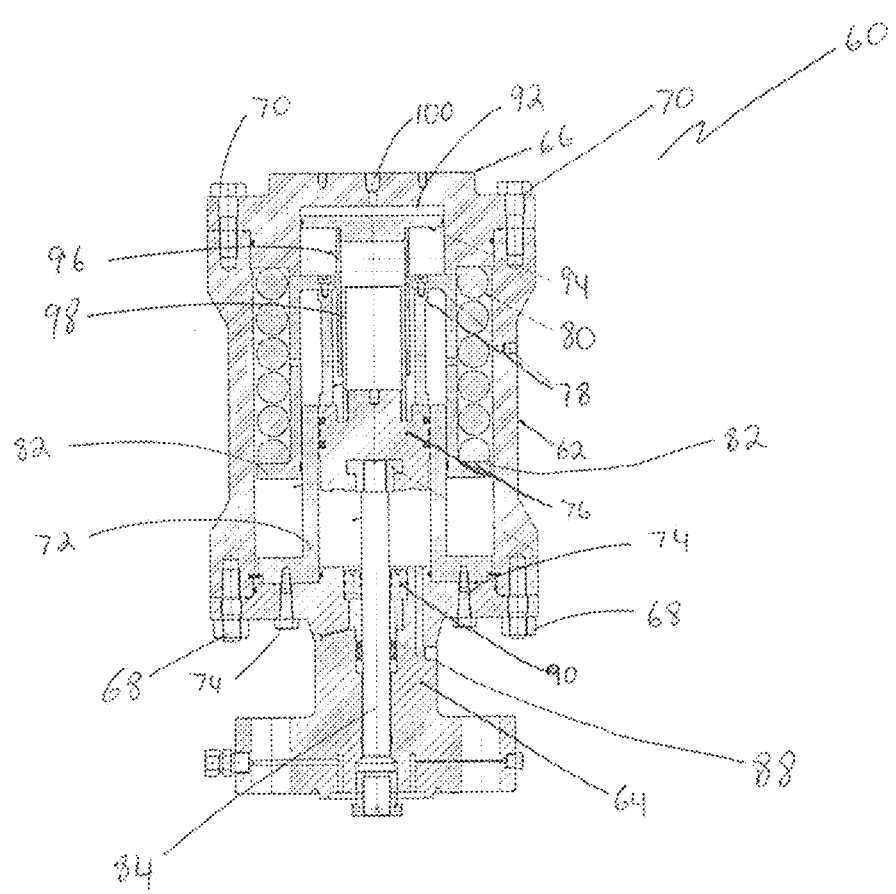
FIG. 4 illustrates another embodiment of an actuator assembly.
Figure 5:
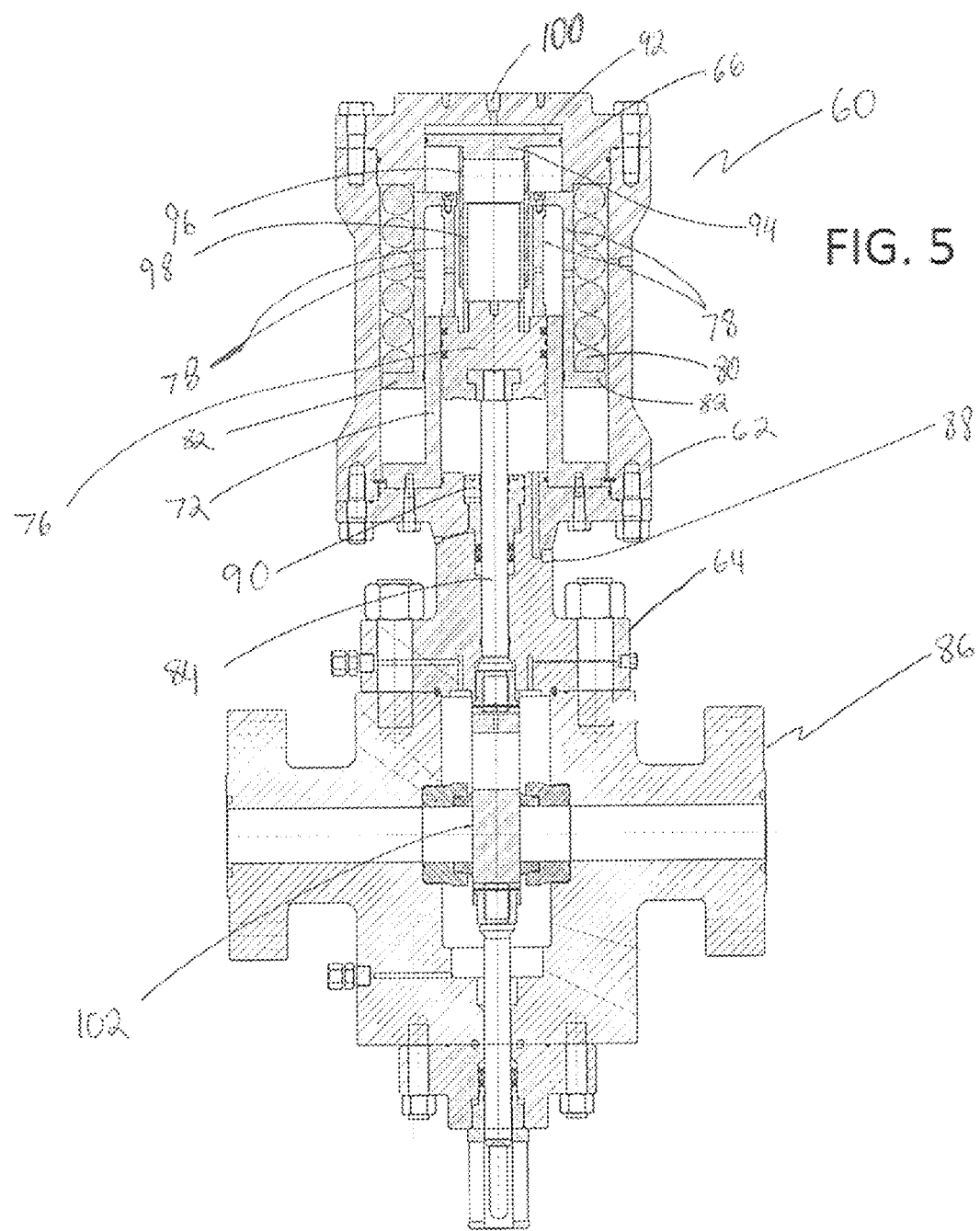
FIG. 5 is another view of the actuator assembly of FIG. 4.

The actuator 10 includes a housing 32 that encapsulates a spring 34, a cylinder 36, a spring lifter assembly 38, and a piston 40 coupled to an operating stem 42. There is also provided a pressure compensator 44, which can be positioned as shown in FIGS. 1-3 external to the actuator housing or positioned within the actuator housing as shown in FIGS. 4 and 5. Specifically, in the actuator assembly of FIGS. 1-3, the pressure compensator 44 is coupled to an exterior wall of the actuator housing 32 which is used to equalize the pressure inside the actuator housing to the outside seawater pressure. The pressure compensation will be discussed in greater detail below.

In operation, the piston 40 within the actuator housing 32 is moved upward or downward between a first position and second position which in turn moves the operating stem 42 so that the gate valve 16 can be positioned within the passageway 20 in the valve body 14. It should be noted that the upward position can be either an open or closed position of the valve depending on the construction of the gate valve.

Now turning to FIGS. 2 and 3, the internal components of the actuator 10 will be discussed in greater detail. The actuator 10 includes housing 32 that is coupled to the bonnet 22 at a first end and a monolithic housing lid 46 at a second end. Within the housing 32 is the hydraulic cylinder 36 that is threadably attached to the bonnet 22. The piston 40 is positioned within the hydraulic cylinder 36 at the first end of the actuator housing 32 adjacent to the bonnet 22 and is coupled to the operating stem 42. The piston 40 is also coupled to or in direct contact with the spring lifter assembly 38 which is coupled to the spring 34. The spring lifter assembly 38 is configured so that a first portion is in contact with the piston 40 and a second portion is in contact with the spring 34. The spring lifter assembly 38 includes a spring lifter 48 coupled to the piston 40 at one end and the spring at the other end. The spring 34 is positioned between the actuator housing 32 and the spring lifter assembly 38 and adjacent to the lower portion of the housing lid 46. As hydraulic pressure fluids are applied into the cylinder via a hydraulic port 50, the spring lifter assembly 38 is operated as to the move the piston 40 up and down within the hydraulic cylinder 36.

Now turning to another embodiment of the present invention, FIGS. 4 and 5 illustrate an actuator assembly 60 having an internal pressure compensator. The actuator 60 is provided with an actuator housing 62 that is coupled to a bonnet 64 (via bolts 68) and a housing lid 66 by bolts 70. Although bolts 70 are used is this particular embodiment, it should be noted any type of mechanical mechanism to attach the lid 66 and the bonnet 64 to the housing 62 may be used.

Within the actuator housing 62, there is provided a hydraulic cylinder 72 which is coupled to the bonnet 64 by bolts 74. A piston 76 is positioned within the hydraulic cylinder 72 and coupled to spring lifter assembly 78. The spring 80 is positioned so that at one end, it is coupled to the inner surface of the housing lid 66 and the other end it is in contact with the flange portions 82 of the spring lifter assembly 78.

The hydraulic cylinder 72 may be threadably coupled to the bonnet or bolted (Shown) to the bonnet 64 as illustrated in FIGS. 4 and 5. The piston 76 which is positioned within the hydraulic cylinder 72 is coupled to the spring lifter assembly 78 and an operating stem 84 that extends through the bonnet 64 into the valve assembly 86. The positioning of the hydraulic cylinder 72 adjacent to the bonnet 64 provides the advantage of reducing the height of the actuator and reduces the operating stem length, thereby allowing for a more rigid construct.

A hydraulic control port 88 and hydraulic assist port may be drilled allowing passage into the hydraulic cylinder 72. The control port 88 provides the connection to the external hydraulic control line used to either open or close the gate valve. The actuator 60 may be configured to either automatically open or close upon failure of the hydraulic system depending on the valve design.

The hydraulic cylinder 72 is sealed to contain the hydraulic fluid. Specifically, these seals are provided between the piston 76 and the hydraulic cylinder 72 and between the operating stem 84 and the bonnet 64, so that the hydraulic fluid is isolated from the other areas of the actuator housing 62. In the preferred embodiment, the hydraulic cylinder 72 contains all the hydraulic fluid, as a result, the spring 80 is completely isolated from the hydraulic fluid.

A packing gland 90 is also positioned to provide additional primary seals to seal around the operating stem 84 and bonnet 64. The packing gland 90 may be threadably attached to the bonnet 64. The packing gland 90 provides additional support for packings and primary seals to seal around the operating stem 84 and any extensions to the operating stem 84. In the particular embodiment, the packing gland 90 is threadably attached to the bonnet 64. The packing gland 90 is sealed with respect to the bonnet 64 by any conforming type of seal. There is also provided a relief valve between the packing and packing gland seal, if leakage should occur. The relief valve is a one-way valve that will open if the internal pressure at relief valve is greater than the hydrostatic pressure external to the actuator thereby relieving pressure before the pressure becomes great enough to leak past any adjacent seals providing safety for the actuator.

The actuator 60 also includes an internal compensator assembly which is configured to be positioned within a recess 92 of the actuator lid 66. The compensator assembly is used to maintain a constant equilibrium pressure between the spring housing and the sea water.

The compensator assembly includes a compensator piston 94 that is free floating and inner and outer sleeve guides 96, 98. As the actuator 60 is descended to depth, water pressure acts on the piston 94 through port 100 and equalizes the pressure applied when piston 76 is moved upwards and displaces the fluid within the compensator assembly towards the compensator piston 94. The compensator piston 94 is free floating and is guided by the inner sleeve guide 96 and the outer sleeve guide 98. In operation, as hydraulic fluid which is contained within the cylinder 72 is used to actuate the cylinder piston 76 to move the operating stem 84, the internal compensator piston 94 equalizes the pressure between the sea water external to the actuator and the fluid pressure within the actuator housing/spring housing assembly. This feature provides an automatic internal pressure compensator and enables the pressure within the actuator to be compensated from the external pressure applied by the water depth.

During operation of the actuator to move the gate valve 102, hydraulic fluid is introduced through the control port 88 to pressurize the hydraulic piston to move in a first direction, the hydraulic piston 76 is moved in the first direction, it also moves the operating stem 84 which in turn moves the valve gate 102. This motion also moves the spring lifter assembly 78 in a first direction to compress the spring 80 via the spring lifter flanges 82. To move the valve gate 102 in a second direction, the hydraulic pressure is released from the control port 88. The spring moves 80 the operating stem 84 and hydraulic piston 76 in the second direction thereby moving the gate valve in the second direction. As the gate valve 102 is moved in the either first or second direction, the internal pressure compensator equalizes the pressure continuously between the seawater pressure and the fluid pressure within the actuator/spring housing assembly.

The advantages provided by the features illustrated in the embodiment of FIGS. 1-5 include no drag by the spring since the spring is positioned within a recess at the bottom of the lid. Also, the piston is positioned at the first end of the housing, allowing for a more rigid construction, causing less or no vibration of the system during operation. Another advantage of the actuator systems is that since the cylinder is threadably attached or bolted directly to the bonnet, concentricity of the central channel is maintained so that there is no metal to metal drag and no friction. Also, the present assembly provides an absence of drag on seals or the operating stem, and generally less frictional resistance within the components of the assembly. Finally, coupling the hydraulic cylinder directly to the bonnet, allows for the operating stem to be shorter so that the stem is more rigid and no galling occurs during operation.

It will be apparent to those skilled in the art that various modifications and variations can be made in the disclosed systems and processes without departing from the scope of the disclosure. Other examples of the disclosure will be apparent to those skilled in the art from consideration of the specification and practice of the disclosure disclosed herein. It is intended that the specification and examples be considered as exemplary only.

I claim:

1. A valve actuator assembly comprising:
    an actuator housing coupled to a bonnet and a housing lid;
    a hydraulic cylinder positioned within the actuator housing and threadingly coupled to the bonnet;
    a piston positioned within the hydraulic cylinder and coupled to a spring lifter assembly;
    a spring positioned within the actuator housing and having a first end and a second end, the first end being in contact with a lower surface of the housing lid, and the second end configured to be in contact with the spring lifter assembly; and an operating stem coupled to the piston and positioned in a channel extending through the bonnet to a valve body assembly.

2. The valve actuator assembly of claim 1, wherein the actuator assembly further comprises a pressure compensator positioned externally and adjacent to the actuator housing.

3. The valve actuator assembly of claim 1, wherein the operating stem is coupled to a gate.

4. The valve actuator assembly of claim 1, wherein a stroke adjustment is positioned on an upper surface of the housing lid.

5. The valve actuator assembly of claim 1 comprising a pressure compensator inside the actuator housing.

6. The valve actuator assembly of claim 5, wherein the pressure compensator is positioned within a recess of the housing lid.

7. The valve actuator assembly of claim 5, wherein the pressure compensator includes a free-floating piston, an outer sleeve guide and an inner sleeve guide.

8. The valve actuator assembly of claim 7, wherein the free-floating piston is configured to travel from a first position to a second position based on a pressure differential between fluid contained within the actuator housing and pressure immediately external to the valve actuator assembly.

9. A valve actuator assembly comprising:
an actuator housing coupled to a bonnet and a housing lid;
a hydraulic cylinder positioned within the actuator housing and directly contacting the bonnet;
a piston positioned within the hydraulic cylinder and coupled to a spring lifter assembly;
a spring positioned within the actuator housing and having a first end and a second end, the first end being in contact to a lower surface of the housing lid, and the second end being in contact with the spring lifter assembly;
an operating stem coupled to the piston and positioned in a channel extending through the bonnet to a valve body assembly; and
an internal pressure compensator positioned within the actuator housing and adjacent to the lower surface of the housing lid, the internal pressure compensator having an internal piston, an outer sleeve and an inner sleeve;
wherein (a) the bonnet directly contacts the valve body assembly, and (b) the stem is aligned along a vertical axis and a horizontal axis intersects both the bonnet and the hydraulic cylinder.

10. The valve actuator assembly of claim 9, wherein the operating stem is coupled to a gate.

11. The valve actuator assembly of claim 9, wherein a stroke adjustment is positioned on an upper surface of the housing lid.

12. The valve actuator assembly of claim 9, wherein the hydraulic cylinder is threadably engaged to an upper surface of the bonnet.

13. The valve actuator assembly of claim 9, wherein the internal piston of the pressure compensator is free-floating.

14. A valve actuator assembly comprising:
an actuator housing coupled to a bonnet and a housing lid;
a hydraulic cylinder positioned within the actuator housing and coupled to the bonnet;
a piston positioned within the hydraulic cylinder and coupled to a spring lifter assembly;
a spring positioned within the actuator housing and having a first end and a second end, the first end being coupled to a lower surface of the housing lid, and the second end being coupled to the spring lifter assembly;
an operating stem coupled to the piston and positioned in a channel extending through the bonnet to a valve body assembly; and
an internal pressure compensator positioned within the actuator housing and adjacent to the lower surface of the housing lid, the internal pressure compensator having an internal piston, an outer sleeve and an inner sleeve,
wherein the internal piston is configured to move to equalize pressure between (a) pressure immediately external to the valve actuator assembly and substantially surrounding the valve actuator assembly, and (b) fluid contained within the actuator housing.

15. The valve actuator assembly of claim 14, wherein the operating stem is coupled to a gate.

16. The valve actuator assembly of claim 1 wherein the spring is between the lower surface of the housing lid and the bonnet.

17. The valve actuator assembly of claim 1 wherein a majority of the hydraulic cylinder is within the actuator housing.

18. The valve actuator assembly of claim 1 comprising:
a port to fluidly couple the hydraulic cylinder to a hydraulic fluid source that is external to the valve actuator assembly;
wherein the piston is configured to move within the hydraulic cylinder in response to hydraulic fluid traversing the port.

19. The valve actuator assembly of claim 9, wherein a majority of the internal pressure compensator is positioned within the actuator housing.

20. The valve actuator assembly of claim 14, wherein the internal piston is free-floating.

* * * * *